United States Patent [19]

Schott

[11] Patent Number: 4,587,949

[45] Date of Patent: May 13, 1986

[54] COMBUSTION HEATER

[76] Inventor: Lawrence A. Schott, 15940 Warwick Rd., Detroit, Mich. 48239

[21] Appl. No.: 607,569

[22] Filed: May 7, 1984

[51] Int. Cl.$^4$ ............................................. F24H 3/12
[52] U.S. Cl. .................................... 126/117; 126/114; 122/183
[58] Field of Search ............... 126/363, 365, 364, 361, 126/101, 117, 103, 116 R, 99 R, 99 A, 99 C, 99 D, 114, 144; 431/215, 243; 122/13 R, 18, 17, 16, 157, 183, 367 C; 165/4, 154, 156, 160, 165; 110/234, 315

[56] References Cited

U.S. PATENT DOCUMENTS

| | | | |
|---|---|---|---|
| 436,075 | 9/1890 | Evans | 126/117 |
| 1,382,495 | 6/1921 | Fowles | 126/363 X |
| 2,225,181 | 12/1940 | Powers | 126/117 X |
| 2,348,569 | 5/1944 | Peters | 126/117 X |
| 2,616,412 | 11/1952 | Backus | 126/101 |
| 2,752,912 | 7/1956 | MacCracken | 126/117 X |
| 2,972,985 | 2/1961 | Allen | 122/183 |
| 3,018,773 | 1/1962 | Donnison | 126/110 R |
| 3,156,972 | 11/1964 | Cimochowski | 126/144 X |
| 3,490,420 | 1/1970 | Kramer | 122/17 |
| 3,641,953 | 2/1972 | Herzberg | 126/144 X |
| 4,338,888 | 7/1982 | Gerstmann et al. | 122/18 X |
| 4,366,778 | 1/1983 | Charrier et al. | 122/17 |

FOREIGN PATENT DOCUMENTS 47421  6/1933  Denmark ..................... 122/157

Primary Examiner—Randall L. Green
Attorney, Agent, or Firm—Barnes, Kisselle, Raisch, Choate, Whittemore & Hulbert

[57] ABSTRACT

A heater for air and liquid utilizing a combustible fuel which includes a first vertical stack including a combustion tube or heat stack with a bottom burner. The heat stack is surrounded by a heat transfer unit with alternate down passages and up passages. The down passages carry the heated exhaust gas. The up passages carry the fluid to be heated. A second vertical stack carries outgoing combustion gases, incoming secondary air supply for combustion, and incoming air to be heated or fluid to be heated. A heat transfer arrangement in the second stack transfers heat from outgoing combustion gases to incoming space air and combustion support air when the unit is used as a space heater.

1 Claim, 8 Drawing Figures

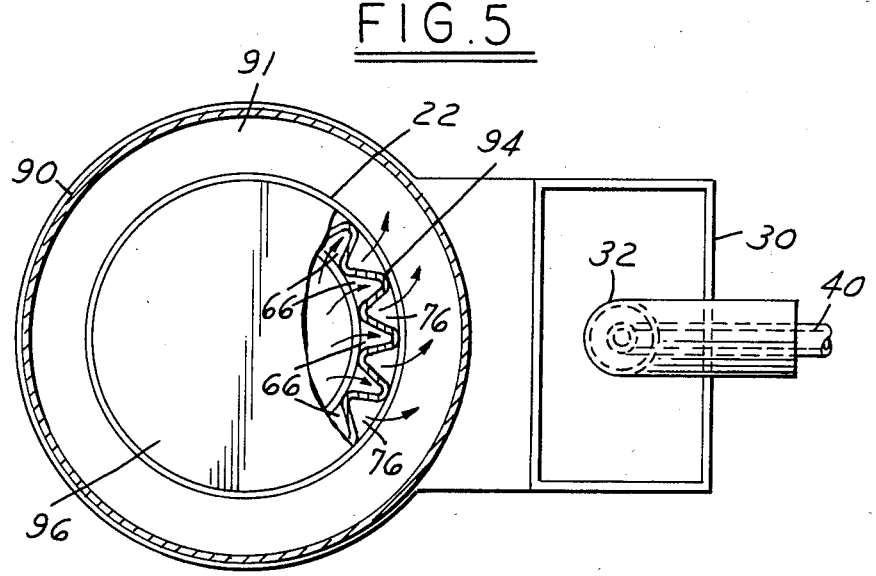
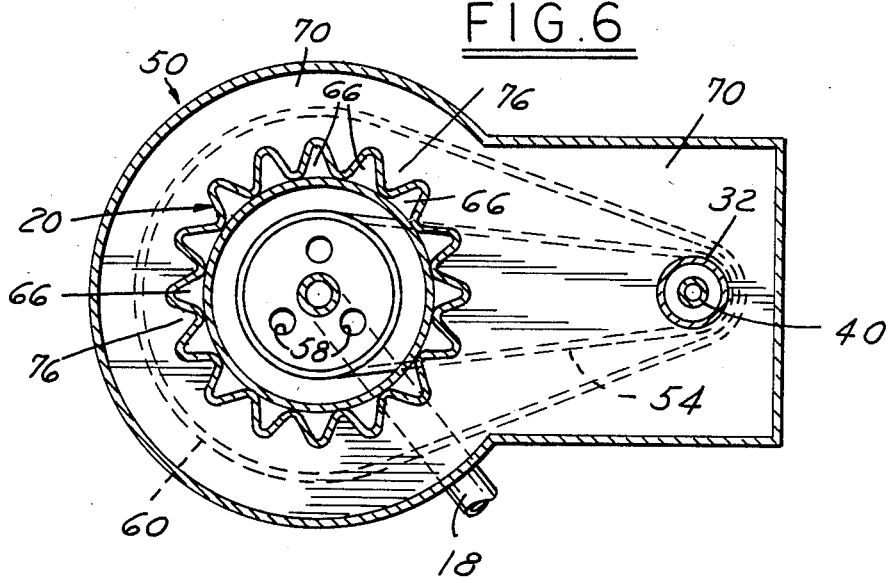

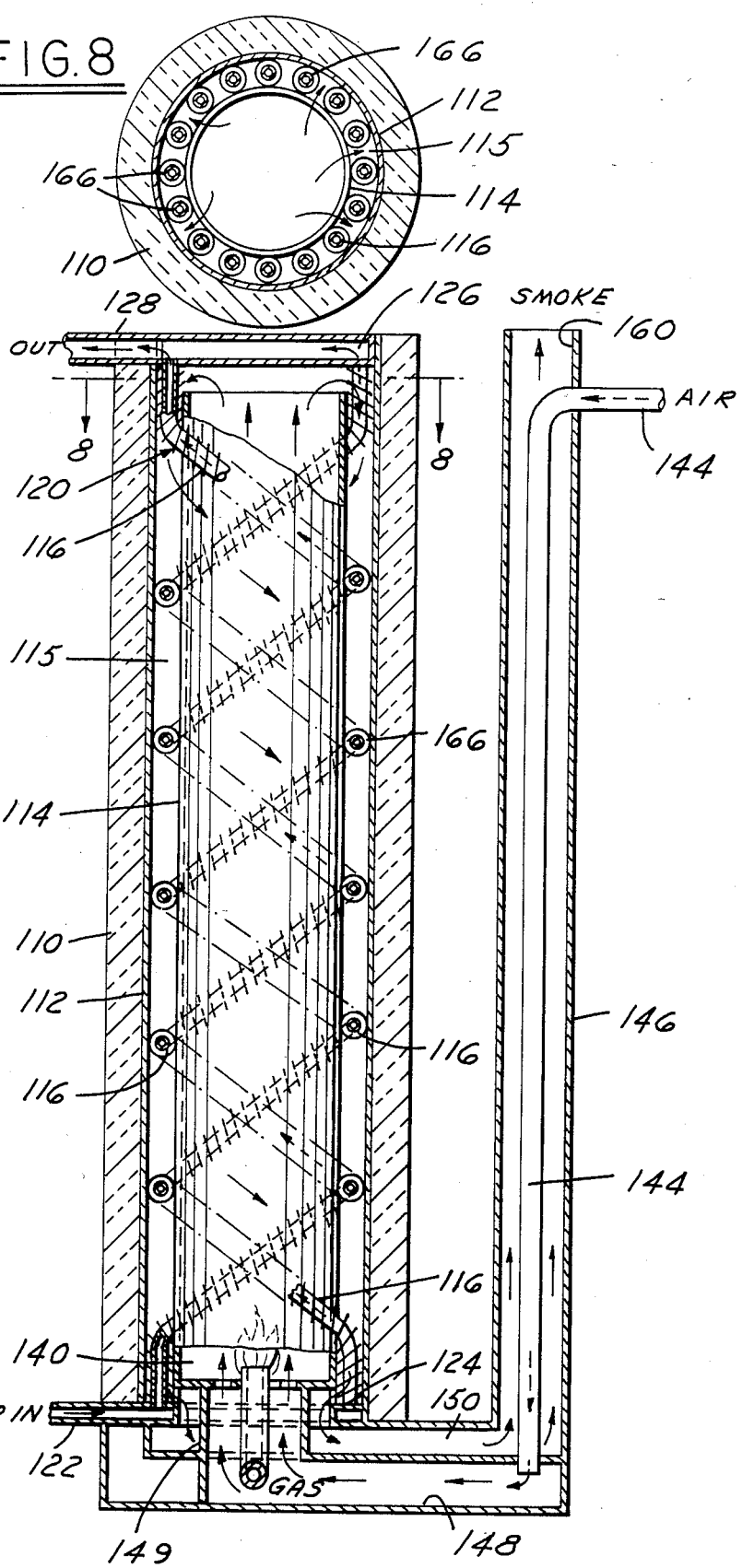

COMBUSTION HEATER

FIELD OF THE INVENTION

Heaters using a combustible fuel and designed to be a space or water heater for homes and other living and working areas.

BACKGROUND OF THE INVENTION

With fuel shortages and the current emphasis on the efficient use of fossil fuel, it is important that devices using such fuel be as efficient as possible. This aim entails not only the complete burning of the specific fuel but an efficient and effective transfer of the heat of combustion to the fluid being heated so that very minimal heat is discharged into the atmosphere.

It is an object of the invention to provide a heating unit which insures complete combustion of the selected fuel and a maximum transfer of the heat of combustion to the space air or water to be heated.

Other objects and features of the invention will be apparent in the following description and claims in which the invention is described together with the manner and process of using it as directed to persons skilled in the art to enable use and practice of the invention, all in connection with the best mode presently contemplated for the invention.

BRIEF DESCRIPTION OF THE DRAWINGS

Drawings accompany the disclosure and the various views thereof may be briefly described as:

FIG. 5, a horizontal section on line 5—5 of FIG. 1.
FIG. 6, a horizontal section on line 6—6 of FIG. 1.
FIG. 7, a vertical section of a modified heating unit for heating water.
FIG. 8, a sectional view of the modified embodiment taken on line 8—8 of FIG. 7.

DETAILED DESCRIPTION OF THE INVENTION AND THE MANNER AND PROCESS OF USING IT

Figure 1:
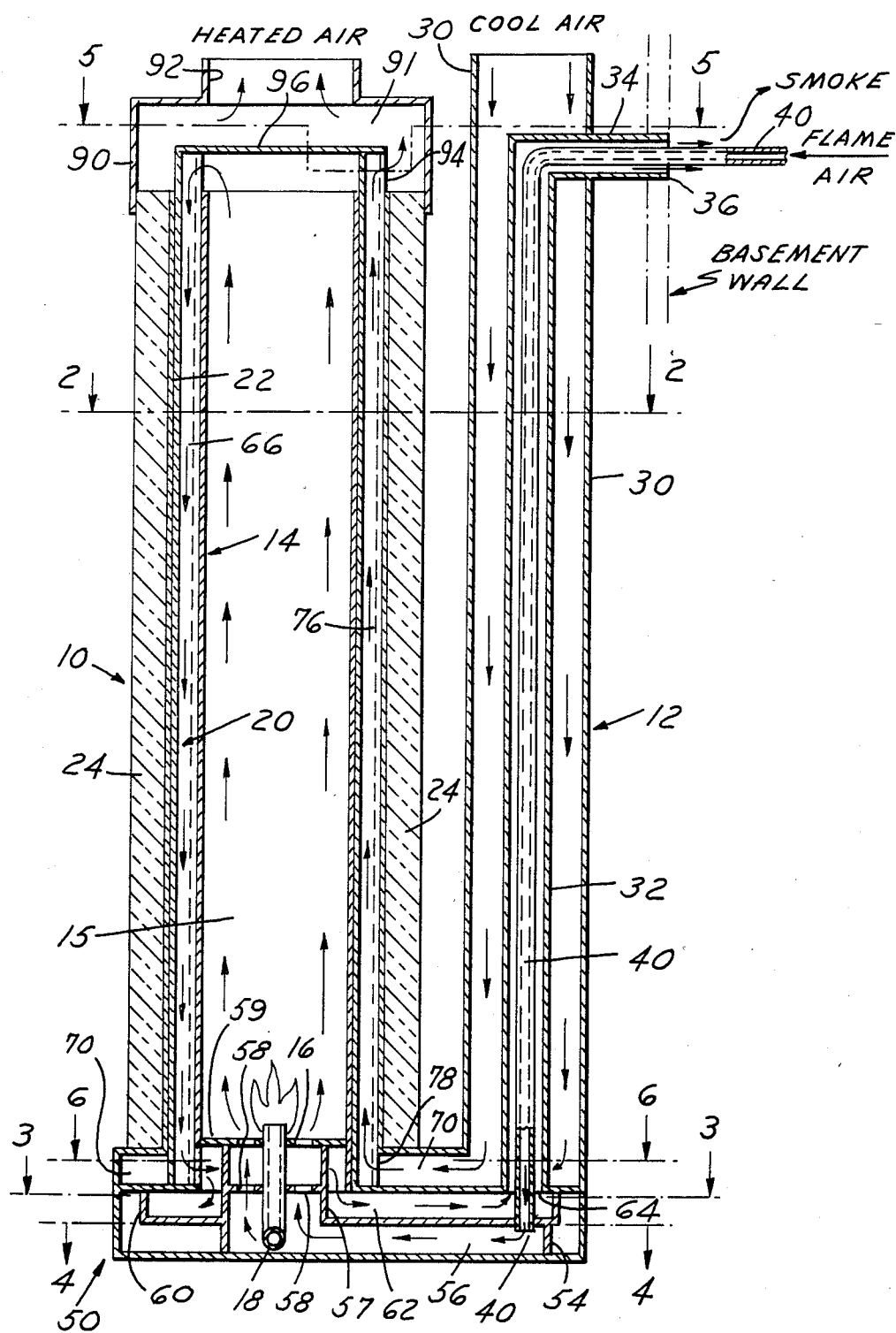
FIG. 1, a vertical section of the heating unit.

In FIG. 1, a vertical sectional view of the heating unit assembly is illustrated with two basic columns 10 and 12.

Column 10 is the heating unit per se. An inside fire resistant tube 14 provides a combustion chamber and heat stack 15 with a burner 16 at the base. The fire resistant tube 14 is preferably highly insulated so that combustion gases will not be cooled as they rise in the tube. Thus, they will rise with considerable velocity and create a down pressure and flow in heat exchange passages to be described. A suitable efficient heat resistant insulation with an asbestos base can be utilized.

Figure 2:
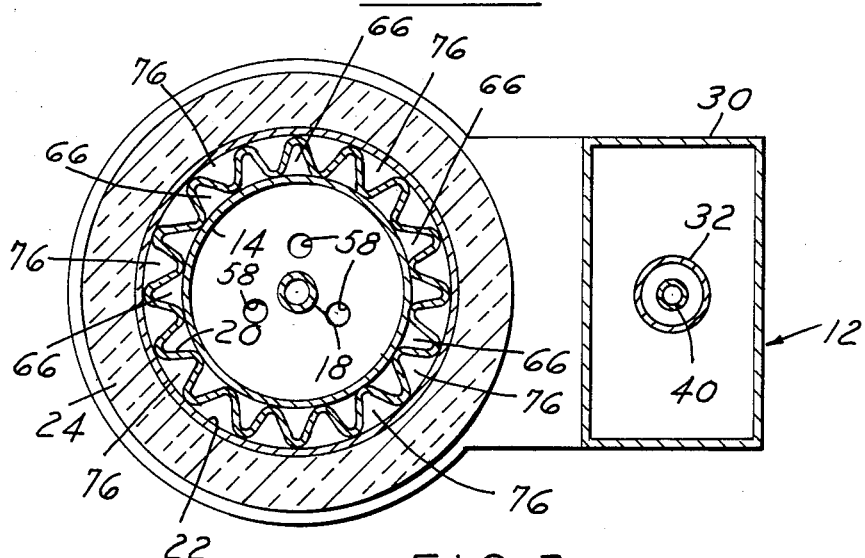
FIG. 2, a horizontal section on line 2—2 of FIG. 1.

Surrounding the heat resistant tube 14 which forms a heat stack 15 is a circular corrugated cylinder 20 colinear with tube 14. A sectional view in FIG. 2 illustrates the shape of this corrugated cylinder 20. A confining cylinder 22 surrounds the corrugated cylinder. Outside of the confining cylinder 22 is a cylindrical insulation shield 24.

Referring now to the column 12, also shown in section in FIG. 2, an outer air duct 30 is open at the top and within the duct is an exhaust gas outlet tube 32 which angles outward at 34 to an atmospheric opening 36. Concentrically located within the tube 34 is a combustion-support air supply pipe 40 which extends outwardly beyond the opening 36 to prevent exhaust gases from entering pipe 40.

Figure 3:
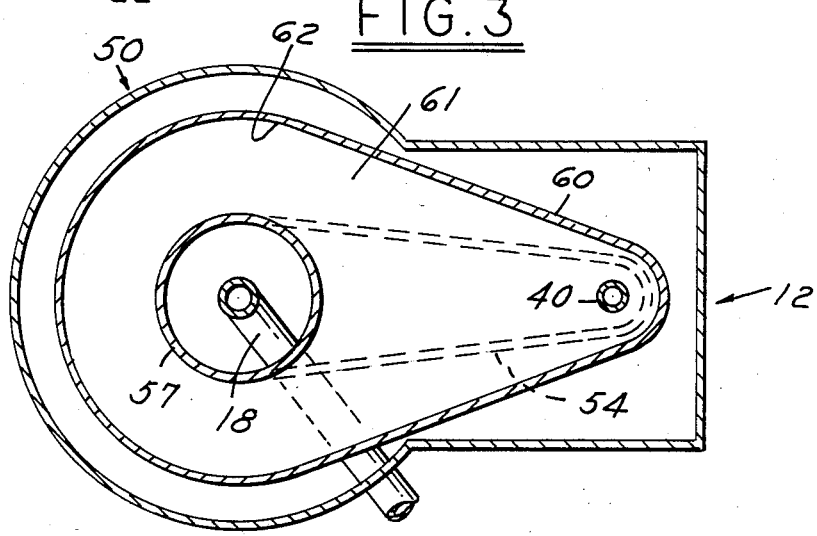
FIG. 3, a horizontal section on line 3—3 of FIG. 1.
Figure 4:
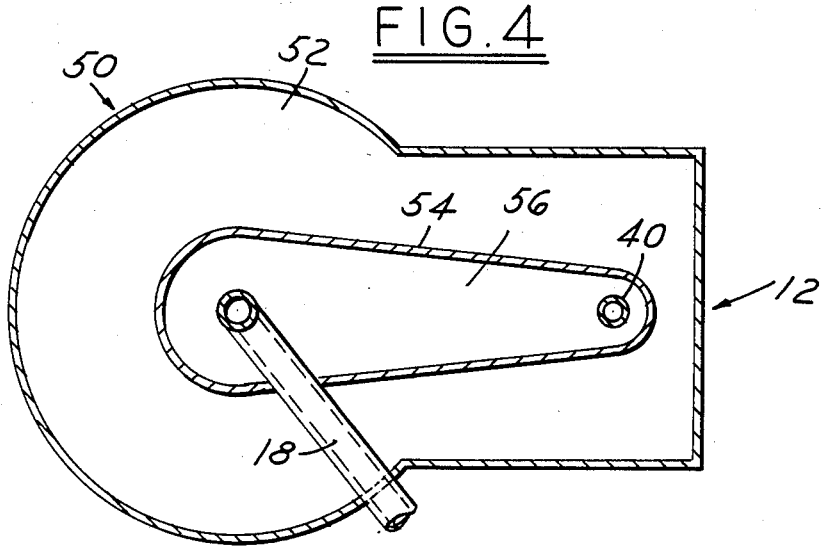
FIG. 4, a horizontal section on line 4—4 of FIG. 1.

At the bottom of the columns 10 and 12 of the unit is a multiple manifold base 50 shown in vertical section in FIG. 1 and in three horizontal sectional views of FIGS. 3, 4 and 6.

Referring, first, to FIGS. 1 and 4, the base 50 has a key-hole shaped chamber 52 within which is an elongate housing 54 forming a chamber 56 which is open to the bottom of an air inlet pipe 40 at one end and to the bottom of combustion chamber 15 through a circular housing 57 and ports 58. Thus, combustion support air is furnished to the combustion chamber 15 through pipe 40, chamber 56 and pots 58. At the burner level 16 a circular plate 59 closes the bottom of the combustion tube 14.

Moving upward one level in base 50 to the sectional view of FIG. 3, there is a tear drop shaped wall 60 with a top wall 61 which closes the annular bottom of the corrugated cylinder 20 and also the bottom of air inlet duct 30. The wall 60 forms a chamber 62 open at the small end to the bottom 64 of tube 32. The large end of the chamber 62 within wall 60 is open to the lower ends of alternate vertical passages 66 in the corrugated cylinder 20 around the circular housing 57. One of these passages 66 is shown in FIG. 1. Others are illustrated in FIG. 2. These V-shaped passages have the base of the V open to the outside of the wall of the combustion tube 14.Thus, the downflow of combustion gases in passages 66 will reach chamber 62 and escape through vertical tube 32 to the outlet 34, 36.

Moving upwardly to a third level in housing 50 we find a cross-section illustrated in FIG. 6. The chamber 70 within the base 50 is open at the right-hand end to the bottom of space-air inlet tube or duct 30. This chamber 70 is also open to the sides of the lower end of alternate, vertical passages 76 in the corrugated cylinder 20. One of these passages is shown in FIG. 1 with a bottom side opening 78 open to the chamber 70. In FIGS. 2, 5 and 6, these passages 76 alternate with passages 66. The apices of the V passages 76 are adjacent the ouside wall of the combustion tube 14 and the open side of the passages are adjacent the confining cylinder 22.

Thus, air to be heated enters duct 30 and, through chamber 70, reaches the riser passages 76 through manifold openings 78.

Looking now at the top cap of the column 10 we find a circular shell 90 forming a chamber 91 shown in cross-section in FIG. 5. The shell has a heated air outlet 92 and the passages 76 of the corrugated cylinder are manifolded to the chamber 91 through ports 94. The top of the combustion tube 14 is capped by a lid 96 which performs the manifolding function wherein the interior of combustion chamber 15 is ported to the down-passages 66, and the up-passages 76 are ported to the outlet cap 90.

IN THE OPERATION

Furnishing fluid fuel to the burner 16 and igniting the burner causes combustion in the combustion tube or heat stack 15. An updraft in the heat stack causes a steady flow of gases in which the combustibles are totally consumed in a very hot environment of 1500° to 1800° F. The pressure created in this burning in the heat stack causes the resulting combustion gases to flow down the passages 66, thus adding heat to the alternate heating passages 76 and maintaining heat on the tube 14. The tube 14 can preferably be of highly insulative material so that it will not be cooled by the flow in passages 66 and 76. Thus, the combustion gases rise with a high velocity and create pressure at the top manifold so they are forced down (pushed down) through the down-passages 66. As the gases are cooled by a heat transfer, they will tend to flow downward more rapidly. As the incoming air in the up-passages 76 is heated, it will rise more rapidly. The corrugated cylinder 20 is preferably formed of highly conductive material so the heat from down-passages 66 will be readily transferred to the up-flow passages 76 carrying the space air to be heated.

Combustion gases pass from passages 66 around the circular housing 57 to chamber 62 and thence to outlet tube 32. Space air to be heated enters duct 30 and passes into chamber 70 and is manifolded into the up-passages 76 where it takes on the heat from gases in passages 66. The heated air is manifolded into the chamber 91 of cap shell 90 and leaves through the opening 92 to the area to be heated.

The hot combustion tube 15 (heat stack) insures complete combustion of the fuel and the resulting very hot gases will transmit heat to the incoming space air in a counterflow with effect a very efficient heat exchange.

The residual heat in outflowing combustion gases will flow into tube 32 which can transit heat not only to the incoming air in duct 30 but also to the combustion air support supply in pipe 40. Thus, the fluid fuel burns more readily and efficiently when mixed with the incoming preheated air. Accordingly, very little heat is lost to the atmosphere. The system requires no chimney draft since the outflowing products of combustion are pushed out of the system by the pressure of the gases leaving the combustion chamber.

In FIGS. 7 and 8, a modified construction is illustrated utilizing the same principles as described above but adapted to heat a liquid medium rather than air. Thus, the modified embodiment may be used for heating household water, for example, or used for hot water space heating.

In FIG. 7, an outer insulation wall 110 surrounds a cylindrical outer container 112 which is spaced from an inner heating chamber 114. The annular chamber 115 between the inner and outer container is occupied by one or more, and preferably a plurality, of tubes 116 which spiral up around the inner chamber 114 from the bottom to the top. As shown at 120, the tubes are preferably provided with radial fins which will enhance heat transfer.

The liquid inlet for the tubes at the bottom of the unit is at 122 leading to a circular manifold 124. At the top of the unit a manifold unit 126 provides an outlet chamber for an outlet pipe 128.

At the bottom of the assembly is a burner 140 which receives a fluid fuel, gas or oil, from pipe 142. Combustion air for the burner enters a pipe 144 which passes through a combustion-product stack 146 and opens to a chamber 148. This chamber opens through a vertical pipe 149 to the burner 140. A chamber 150 is open to the lower end of exhaust stack 146 and receives residual combustion gases from the bottom of the annular chamber 115 between the containers 112 and 114.

In the operation of this embodiment, the heat from the burner 140 rises through the inner container 114 and, due to the long upward path, almost perfect combustion is obtained. The flue gases then take a downward path through the annular chamber 115 toward the outlet chamber 150 and rise through the vertical stack 146 to an outlet 160. The downward path of the hot exhaust gases will be spiralled to some extent because of the liquid conduits 166 and thus enhance the heat transfer to the liquid medium in the conduits. Heat from the exhaust gases in the stack 146 will transfer to the air inflow pipe 144 to preheat the combustion support air and increase the efficiency of the unit.

Heat from the downwardly flowing gases will transfer to the finned pipes 266 and thus to the up-flowing liquid in the pipes.

I claim:
1. A heating furnace assembly for a fluid medium which comprises:
   (a) a vertical burner chamber,
   (b) a combustion burner at the base of said burner chamber,
   (c) insulated means forming an annular counterflow heat exchange chamber around said vertical burner chamber, and
   (d) heat conductive means within said annular counterflow heat exchange chamber to carry fluid to be heated upwardly within said heat exchange chamber to a suitable outlet for utilization, and to carry combustion gases from said burner chamber downward to an exhaust path,
      whereby heat from said combustion gases will transfer to said fluid to be heated in said counterflow,
   (e) a base on said assembly comprising a plurality of vertically stacked manifold chambers in heat exchange relationship comprising a combustion air chamber connected to said burner, a fluid inlet chamber connected to said heat exchange chamber for fluid to be heated, and a chamber to receive combustion exhaust gases from said heat exchange chamber, said chamber to receive combustion exhaust gases being interposed between said combustion air chamber and said fluid inlet chamber.

* * * * *